(12) United States Patent
Huang

(10) Patent No.: US 6,805,306 B1
(45) Date of Patent: Oct. 19, 2004

(54) CYLINDER RAPID ENGAGEMENT DEVICE IN AN ELECTRICAL SPRAY GUN

(76) Inventor: Jung-Kun Huang, P.O. Box 697, Feng-Yuan City, Taichung Hsien (TW), 420

( * ) Notice: Subject to any disclaimer, the term of this patent is extended or adjusted under 35 U.S.C. 154(b) by 112 days.

(21) Appl. No.: 10/277,899

(22) Filed: Oct. 23, 2002

(51) Int. Cl.[7] .............................. A01G 25/14; B05B 1/08
(52) U.S. Cl. ..................... 239/375; 239/102.1; 239/392; 239/600; 239/526
(58) Field of Search .............................. 239/375, 102.1, 239/102.2, 302, 378, 525, 526, 533.9, 390, 392, 600, DIG. 14

(56) References Cited

U.S. PATENT DOCUMENTS

| | | | | |
|---|---|---|---|---|
| 4,160,525 A | * | 7/1979 | Wagner | 239/332 |
| 4,377,838 A | * | 3/1983 | Levey et al. | 361/228 |
| 4,693,423 A | * | 9/1987 | Roe et al. | 239/332 |
| 5,080,289 A | * | 1/1992 | Lunzer | 239/690 |
| 5,184,778 A | * | 2/1993 | Noakes | 239/691 |
| 5,779,162 A | * | 7/1998 | Noakes et al. | 239/690.1 |
| 6,056,215 A | * | 5/2000 | Hansinger et al. | 239/703 |

* cited by examiner

*Primary Examiner*—Davis Hwu

(57) ABSTRACT

A cylinder rapid engagement device in an electrical spray gun includes a gun housing which contains an electromagnet with a downward extended oscillator in middle portion, an adjustable rod in rear end, a trigger switch in a handle, a semi-cylindrical receiving space abutting a rectangular guide in the front end and plunger under the electromagnet engageable into a cylinder which is made integral with a rectangular block and a lid of a paint container and engageble with thin the semi-cylindrical receiving space and secured into a pair of retaining holes in the gun housing by a pair of flat retaining pieces of a pair of elastic plates from the rectangular block. It is characterized in that the cylinder is smoothly slid in and readily removed out of the gun housing without use a screw so as to provide a great convenience to the user.

3 Claims, 6 Drawing Sheets

CYLINDER RAPID ENGAGEMENT DEVICE IN AN ELECTRICAL SPRAY GUN

BACKGROUND OF THE INVENTION

The present invention relates to spray gun and more particularly to a cylinder rapid engagement device in an electrical spray gun which facilitates a rapid assembly and disassembly of the cylinder into the spray gun.

A prior art spray gun 1 (as shown in FIG. 1) comprises generally a paint container 2, lid 3, a cylinder 4, an electromagnet 5 in the housing of the gun to operate an oscillator 6 projected downward from a lateral side of the electromagnet 5, an adjustable rod 7 engageable with the oscillator 6, a plunger 8 inserted into the cylinder 4 and positioned at front side of the oscillator 6, a screw 9 secured the lid 3 onto the lower housing 12 of the gun body, a trigger switch 10 in a handle to control the operation of the electromagnet 5 and nozzle 11 on the front end of the cylinder 4. When press trigger switch 10 to support the electricity to the electromagnet 5 which will actuate the oscillator 6 to oscillate to repeatedly strike the plunger 8 sliding to and fro in the cylinder 4 that creates a siphonic force to absorb the paint from the paint container 2 into the cylinder 4 and then to spray out of the nozzle 11. This type of spray gun has a disadvantage that the cylinder 4 is integrated with gun housing by a plurality of screws so as the lid 3 of the container 2 that is also connected to the lower housing 12 of the spray gun 1 by screws 9 when cleans the cylinder 4 after finishing a job, one must remove a lot of screws 9 with a screwdriver. The assembly the cylinder 4 and lid 3 to the housing of the gun in the reverse order. This complicated process causes great inconvenience to the user.

SUMMARY OF THE PRESENT INVENTION

The present invention has a main object to provide a cylinder rapid engagement device in an electrical spray gun which the cylinder is rapidly assembled or disassembled within the gun housing for facilitating an user to clean cylinder. The assembly of the cylinder is precise and stable.

Accordingly, the cylinder rapid engagement device in an electrical spray gun of the present invention comprises a gun housing in which is an electromagnet connected to an oscillator extending downward and trigger switch in a handle, an adjustable rod in the rear end of the gun housing engageable with the oscillator, an elastic plunger in a middle portion of the gun housing under the electromagnet and to be operated by the oscillator, a cylindrical receiving space including a rectangular guide thereunder in the front end of the gun housing and pair of retaining holes symmetrically formed in opposing lateral walls of the gun housing. A cylinder integrated with a lid of a paint container is engageable into the cylindrical receiving space and a rectangular block positioned between the cylinder and the lid is engageable into the rectangular guide. The rectangular block has a pair of elastic plates symmetrically formed on opposing lateral sides and each of the elastic plates has a retaining piece at free end respectively held by the pair of retaining holes. So that the cylinder is stably disposed into the cylindrical receiving space. If presses the retaining pieces inward, the cylinder is disengaged with cylindrical receiving space and is readily slid out of the gun housing.

The present invention will become more fully understood by reference to the following detailed description thereof when read in conjunction with the attached drawings.

DETAILED DESCRIPTION OF THE PREFERRED EMBODIMENT

Figure 1:
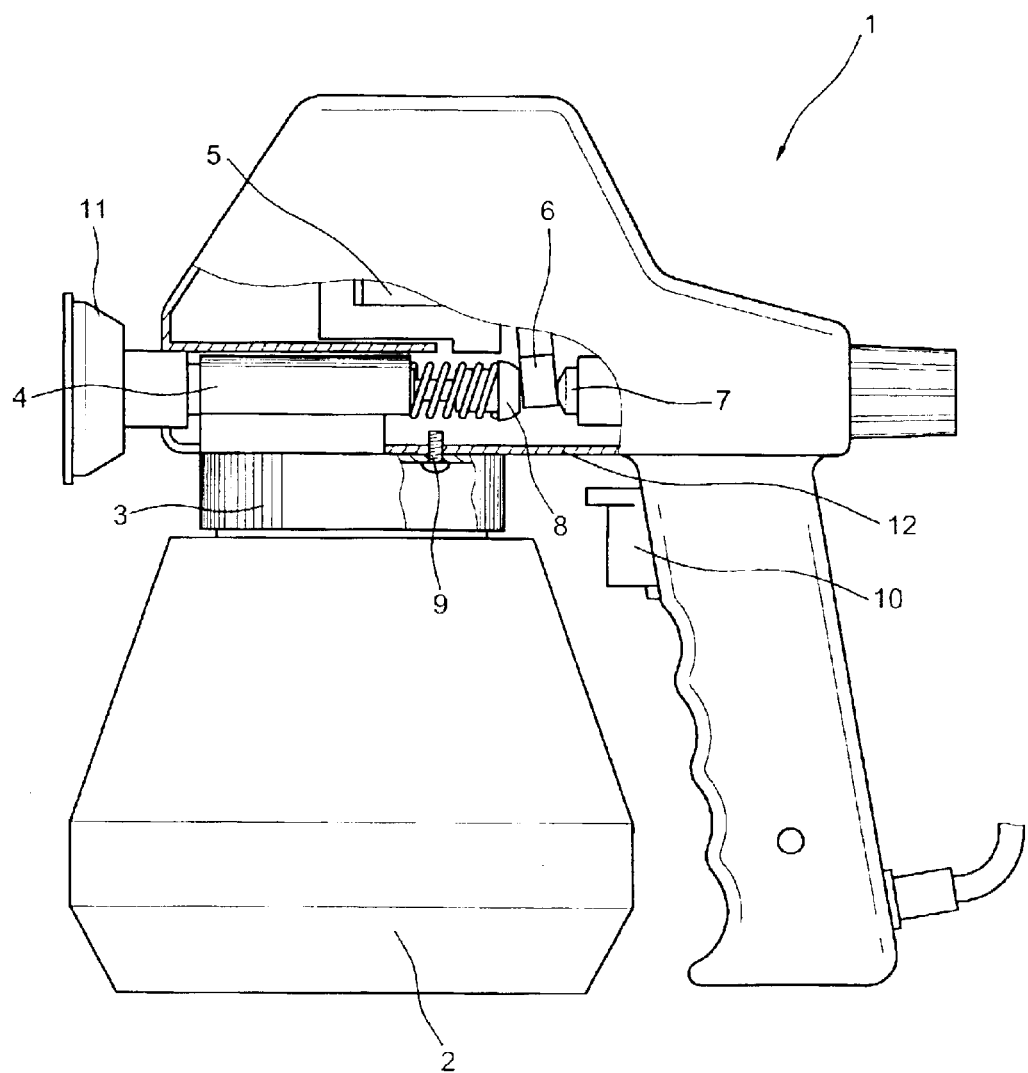
FIG. 1 is a side view and partially sectional to show a spray gun of a prior art.
Figure 2:
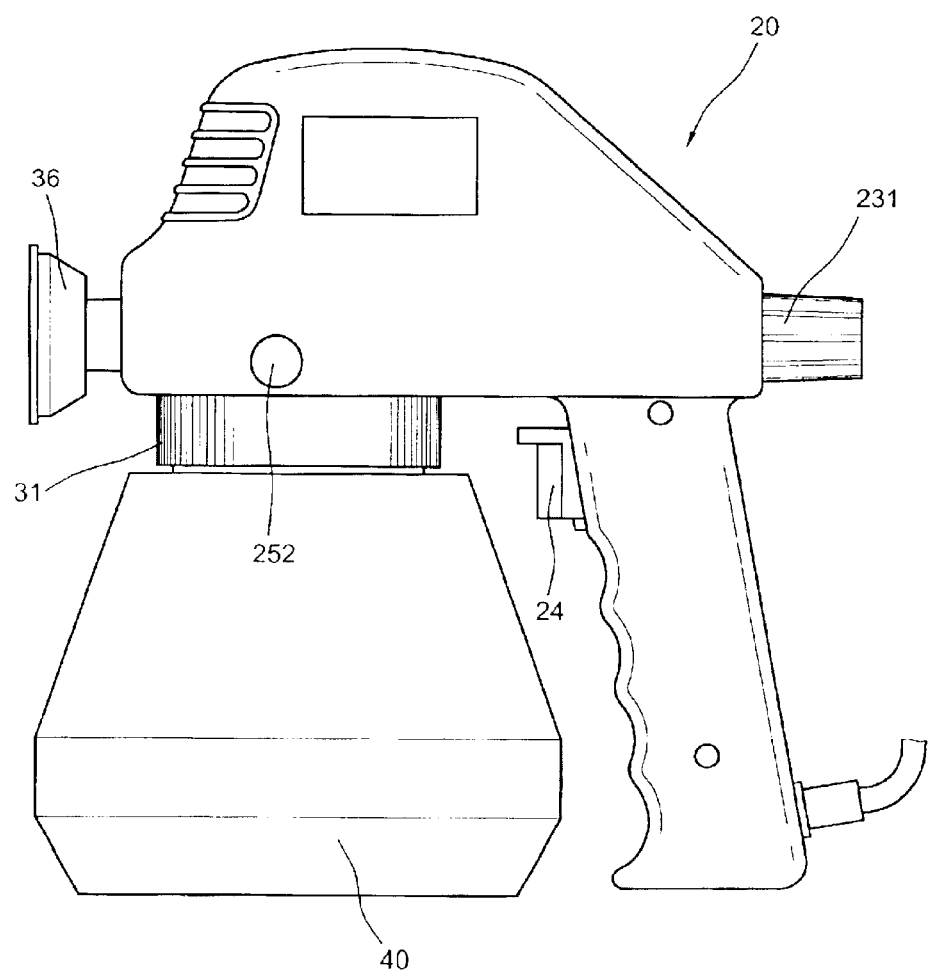
FIG. 2 is a side view to a spray gun of the preferred embodiment according to the present invention.
Figure 3:
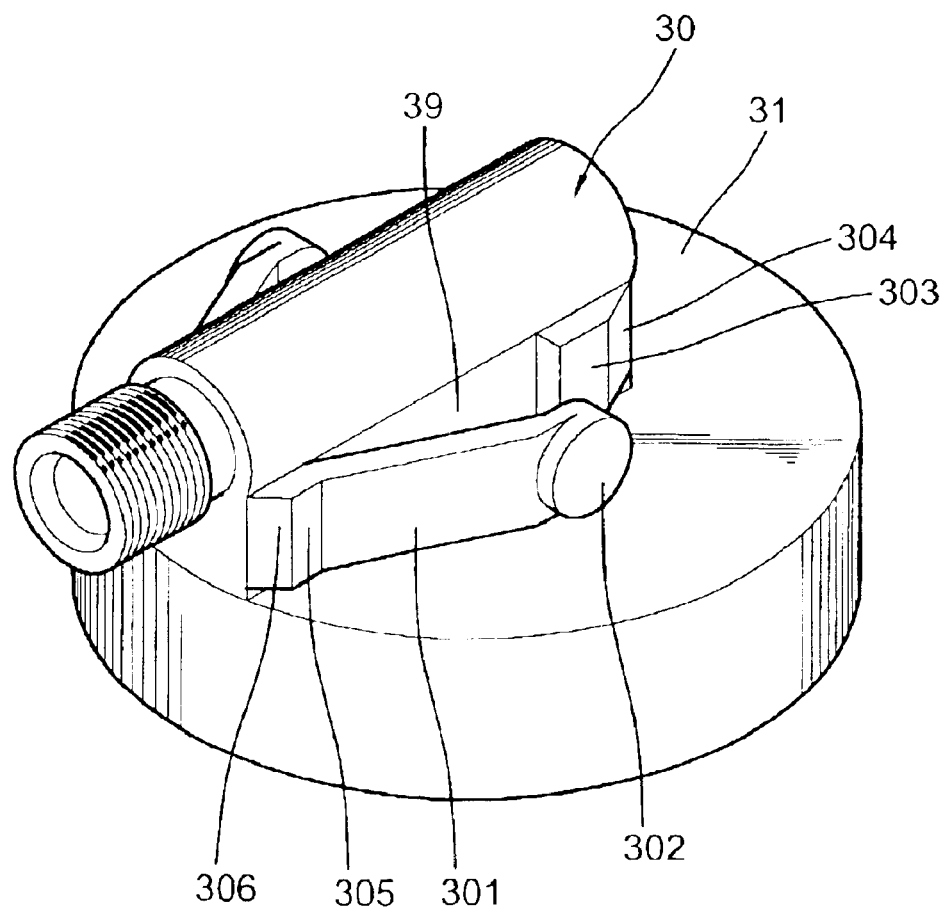
FIG. 3 is a perspective view to show a cylinder integrated with a lid of a paint container.
Figure 4:
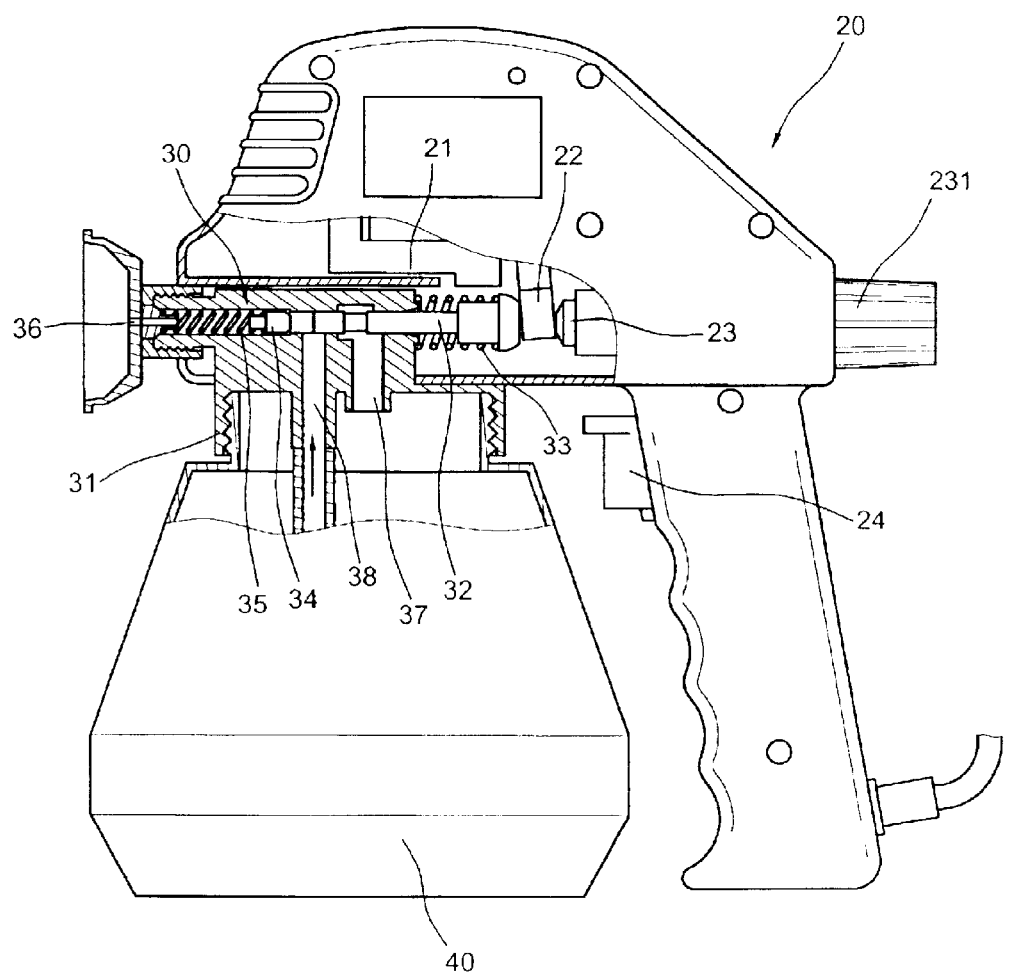
FIG. 4 is a side view with partially sectional view to show the components of the electrical spray gun of the present invention.
Figure 5:
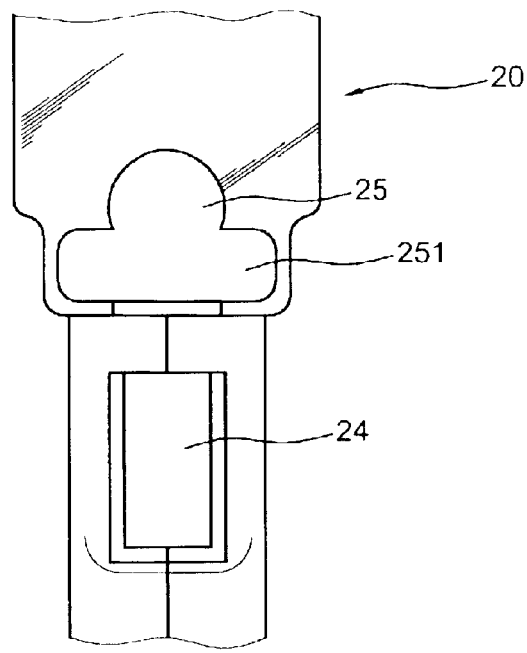
FIG. 5 is a front view to show the electrical spray gun of the present invention.

With reference to FIGS. 2, 3, 4 and 5, of the drawings, the cylinder rapid engagement device in an electrical spray gun of the present invention comprises a gun housing 20 which is integrally made of metallic material and has an electromagnet 21 disposed in a middle portion to actuate an oscillator 22 which extends downward from a lateral side of the electromagnet 21, an adjustable rod 23 having threads on outer periphery slidably disposed in the rear end of the gun housing 20 and operated by a swivel button 231 to adjust the angle of oscillation of the oscillator 22, a trigger switch 24 to control the operation of the electromagnet 21, a semi-cylindrical receiving space 25 abutting a rectangular guide 251 thereunder in the front end of the gun housing 20 and a pair of retaining holes 252 symmetrically formed in opposing lateral walls communicated to the rectangular guide 251. A cylinder 30 is integrated with a lid 31 of a paint container 40 with a rectangular bock 39 positioned therebetween. The cylinder 30 has thread on front outer periphery for screw engaging a nozzle 36 thereon, a non-return valve 34 biased by a first spring 35 disposed front end, a plunger 32 biased by a second spring 33 releasably inserted into the rear end, a first and a second vertical tubes 37 and 38 spacedly formed in the lid 31 and the rectangular black 39 to communicated the paint container 40 with the cylinder 30 for respectively supplying the paint the cylinder 30 and flowing the residual paint back to the container 40. A pair of elastic plates 301 symmetrically extend rearward from opposing lateral side abutting the front end of the rectangular block 39 to form a certain angle with the rectangular block 39 therebetween and each has a flat retaining piece 302 on outer side of free end made engageable with the retaining holes 252 of the gun housing 20. A pair of first guiding plates 303 symmetrically formed on opposing lateral sides abutting the rear end of the rectangular block end each has a sloped surface 304. A pair of second guiding plates 305 symmetrically formed on the roots of the elastic plates 301 and each has a sloped surface 306. The guiding plates 303 and 305 are provided to facilitate a smooth sliding in and readily removing out of the cylinder 30 from the receiving space 25 of the gun housing 20. The flat retaining pieces 302 may in flat circular shape and/or in flat oval shape.

Figure 6:
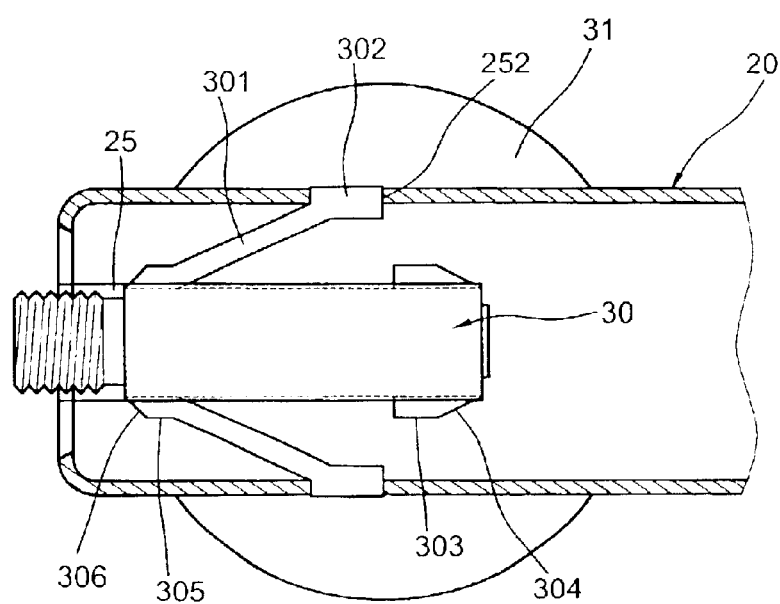
FIG. 6 is a top sectional view to show the engagement of the cylinder with the gun housing.

When disposing the cylinder 30 together with the lid 31 into the gun housing 20, first press the two elastic plates 301 inward and then slide the cylinder 30 into the semi-cylindrical receiving space 25 and the rectangular block 39 into the rectangular guide 251 until that the cylinder 30 and rectangular block 39 are slid in place in the gun housing 20, the two elastic plates 301 will be automatically expanded to having the two flat retaining pieces engaged into the retaining holes 252 of the gun housing 20 in a snap fitting (as shown in FIG. 6). Finally, assemble the nozzle 36 with the front end of the cylinder 30 and the paint container 40 with the lid 31 on their inner and outer threads.

In operation, press the trigger switch 24 inward to supply the electricity to the electromagnet 21 which actuates the oscillator 22 to repeatedly hit the rear end of the plunger 32. Because of the resilience of the second spring 33, the plunger 32 will be slid continuously to and fro in the cylinder 30. In cooperation of the slidable non-retain valve 34 in the front the cylinder 30, a siphonic phenomenon is created inside the cylinder 30 to absorb the paint from the paint container 40 into the cylinder via the first tube 38. The paint is sprayed out of the nozzle 36. The residual paint in the cylinder 30 will drop into the paint container 40 via the second tube 37. The oscillation span of the oscillator 22 is controlled by the adjustable rod 23 in accordance with the requirement of the user.

Figure 7:
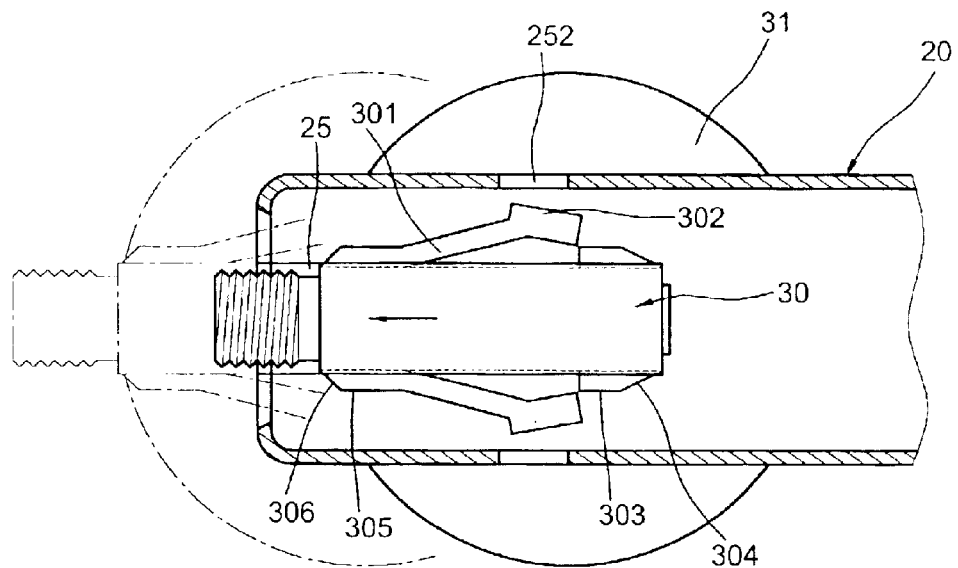
FIG. 7 is a top sectional view to show the disengagement of the cylinder with the gun housing.

When a job is finished, remove both the nozzle 36 and the paint container 40 at first, then press the flat retaining pieces 302 inward to have them disengaged with the retaining holes 252, the cylinder 30 is readily slid out of the gun housing 20 for cleaning the remnant of paint inside the cylinder 30. Both the sliding in and out of the cylinder from the receiving space 25 and rectangular guide 251 would be very smooth because of the sloped surfaces 304 and 306 on two ends of the rectangular block 39 (as shown in FIG. 7).

The rectangular guide 251 is provide not only receiving the rectangular block 39 but also bearing the vertical weight of the paint container 40. Besides, the flat retaining pieces 302 not only fix the cylinder 30 but also limit the horizontal movement of the cylinder 30 in the gun housing 20.

Figure 8:
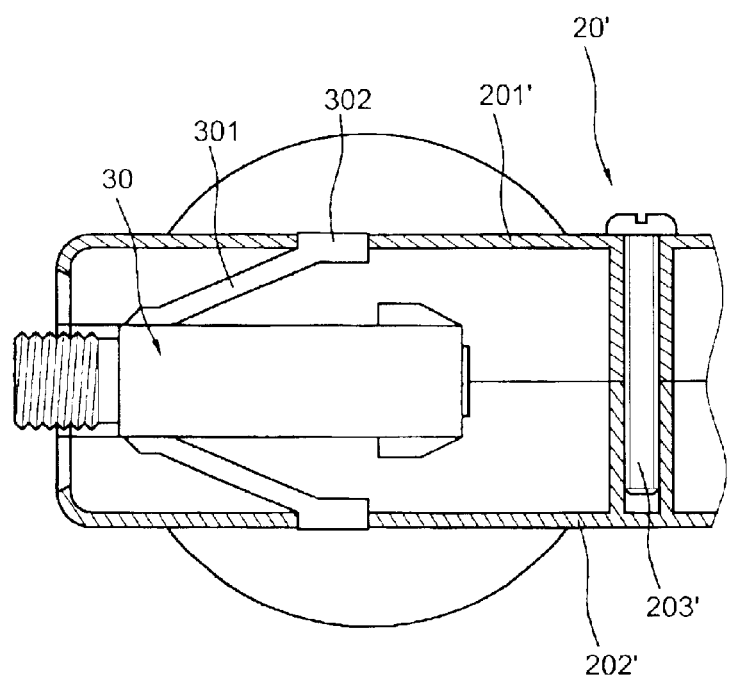
FIG. 8 is a top sectional view to show an alternate structure of the gun housing.

Referring to FIG. 8, if a gun housing 20' is made of plastic material, it could be separated into two corresponding halves 201' and 202' and combined together by a screw 203'.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A cylinder rapid engagement device in an electrical spray gun comprising:

a gun housing integrally made of metallic material and having an electromagnet in a middle portion, an oscillator extending downward from a lateral side of said electromagnet, an adjustable rod connected to a swivel button in rear end of said gun housing engageable with said oscillator, a plunger biased by a second spring means under said electromagnet and engageable with said oscillator, a trigger switch in a handle of said gun housing electrically connected to said electromagnet, a semi-cylindrical receiving space abutting a rectangular guide thereunder in front end of said gun housing and a pair of retaining holes symmetrically formed in lateral walls of said gun housing communicated with said rectangular guide;

a cylinder integrated with a rectangular block and a lid insertable into said semi-cylindrical receiving space and said rectangular guide of said housing, said cylinder having a nozzle on front end, a non-retain valve biased by a first spring in front portion, an opening in rear end to receive front end of said plunger, a paint container releasably connected to said lid on their inner and outer threads, a pair of first and second vertical tubes spacedly formed in said lid through said rectangular block to communicate said cylinder to said paint container, a pair of elastic plates symmetrically extended rearward from lateral sides abutting front end of said rectangular block to form an angle with said rectangular block therebeen and each having a flat retaining piece on an outer surface abutting free end made engageable with said retaining holes of said gun housing, a pair of first guiding plates symmetrically to formed on opposing lateral sides abutting read end thereof and each having a first sloped surface on an outer surface and a pair second guiding plates symmetrically formed on roots of said elastic plates and each having a second sloped surface on an outer surface thereof.

2. The cylinder rapid engagement device as recited in claim 1 wherein said adjustable rod has threads on outer periphery.

3. The cylinder rapid engagement device as recited in claim 1 wherein said gun housing may be made of plastic material including two corresponding halves combined together by a screw.

* * * * *